Oct. 22, 1963    E. L. WALTERS    3,107,458
APPARATUS FOR SURFACING GLASS
Filed Nov. 30, 1960    2 Sheets-Sheet 1

INVENTOR.
Emmett L. Walters
BY
Nobbe & Swope
ATTORNEYS

Oct. 22, 1963  E. L. WALTERS  3,107,458
APPARATUS FOR SURFACING GLASS
Filed Nov. 30, 1960  2 Sheets-Sheet 2

INVENTOR.
Emmett L. Walters
BY
Nobbe & Swope
ATTORNEYS

# United States Patent Office 3,107,458
Patented Oct. 22, 1963

3,107,458
APPARATUS FOR SURFACING GLASS
Emmett L. Walters, Toledo, Ohio, assignor to Libbey-Owens-Ford Glass Company, Toledo, Ohio, a corporation of Ohio
Filed Nov. 30, 1960, Ser. No. 72,778
9 Claims. (Cl. 51—112)

This invention relates broadly to the surfacing of glass and, more particularly, to an improved apparatus which is especially adapted for simultaneously polishing both surfaces of a continuous glass ribbon or sheet, moving along a definite path.

It has been known that a continuous glass ribbon may be ground and/or polished simultaneously on both surfaces as the ribbon moves along a definite path. This operation has been normally referred to in the prior art as either twin grinding or twin polishing. In the prior art, twin grinding was usually accomplished by a series of opposed circular grinding runners rotatable about a centrally disposed runner axis on each side of the glass ribbon. Likewise, the conventional twin polishing devices of the prior art employed a plurality of circular polishing pads freely rotatable about their individual axes, with said plurality of pads being supported on each side of the glass ribbon from a common frame that was itself rotated about an axis perpendicular to the plane of the glass.

It has been further known, as shown and described in U.S. Patents Nos. 1,962,766 and 1,962,767, issued to J. P. Crowley et al. on June 12, 1934, to surface (i.e. grind or polish) the opposed surfaces of a glass sheet moving along a definite path by a special type of oscillating motion of the surfacing unit, wherein the unit includes upper and lower generally rectangular surfacing runners extending substantially the full width of the sheet.

The particular motion of the surfacing tools, typified by the above-cited patents, is most aptly defined as a curvilinear translation with respect to the glass. This curvilinear translation is itself most particularly characterized by the fact that the path of each point on the tool describes a circle, which circle is of equal diameter to the circles described by all other points on the same tool.

According to the prior art in which rotating circular tools or runners were employed, and particularly during the grinding process, the distribution of the grinding slurry to bring the slurry into proper position between a grinding runner and the glass was normally accomplished by inscribing a series of radially spiralling grooves across the runner face. In this case, the slurry would be introduced through an opening at the center of the rotating runner and by centrifugal force would be carried along the outwardly spiralling channels so that the slurry would be distributed uniformly across the glass sheet.

In the case of polishing, the slurry was deposited directly upon the glass and was carried by the glass underneath the polishing felts. Also, these polishing felts were circular pads of fairly restricted diameter so that the slurry or polishing rouge actually had to travel only a slight distance underneath the circular pad to reach the pad center and thereby insure uniform distribution of the polishing slurry underneath the pad.

However, with the advent of present polishing procedures, wherein rather large rectangular runners are used to surface the glass, a serious problem has arisen in connection with the proper slurry distribution underneath the entire glass contacting area of the surfacing tool. This problem is magnified in the case of the rectangular shaped polishing runners following a path characterized by a curvilinear translation because it has been found that the pads or felts of the polishing runners must be pressed onto the glass surface by some external pressure in order to secure the best polishing action. Thus, it could be said, in the case of these rectangular polishing runners, that the glass sheet is actually pinched between opposed surfacing runners. This being the case, external feeding such as was common heretofore in the case of the circular polishing runners of the prior art has proven unsatisfactory. With the polishing runner positively pressed against the glass surface, this pressure prevents the glass sheet from carrying polishing slurry, or rouge deposited on its surface, underneath the full extent of the runner.

Efficient polishing depends to a large extent upon the uniformity of distribution of the polishing slurry over all areas of the glass to be polished. If the slurry distribution should be uneven, then the polishing action of polishing tools will be uneven and the resulting glass finish will be characterized by areas of high polish and areas of inferior polish.

In essence it has been found to be critical that the felt pads carried by the rectangular polishing runners be impregnated or saturated with the polishing medium. This impregnation of the felt is accomplished to a resonable depth to insure that the glass engaging portions of the felts are saturated with a fluid polishing medium. This is essential not only to insure uniform polishing of the glass but also to prevent the frictional force from excessively heating either the pad or the glass, which heat would impair the polishing efficiency or, under some conditions, could cause the glass to break. During polishing the felt tends to dry out due to the frictional heat so that a saturation or impregnation of the pad is desirable as aforediscussed. Thus, to an extent, the impregnation of the pad by a fluid medium is necessary for its cooling effect along with its use for polishing.

It is, therefore, an object of the present invention to provide an improved apparatus for simultaneously polishing both surfaces of a continuous glass ribbon or sheet.

Another object of the invention is the provision of a particularly novel apparatus for insuring a positive and uniform distribution of a polishing slurry or fluid medium to all parts of a rectangular polishing tool pressed into contact with a glass surface in order to obtain a uniform polishing of all areas of the glass surface.

It is a further object of the invention to provide a novel and highly efficient surfacing or polishing runner which includes a plurality of individually movable sections and means for periodically feeding a fluid polishing medium interiorly of at least one of said sections, and substantially simultaneously with said feeding, disengaging said section or sections being fed from the glass surface whereby said fluid polishing medium comes into contact with that portion of the glass surface immediately adjacent any disengaged runner section.

Other objects and advantages of the invention will become more apparent during the course of the following description when taken in connection with the accompanying drawings.

In the drawings wherein like numerals are employed to designate like parts throughout the same:

Figure 1:
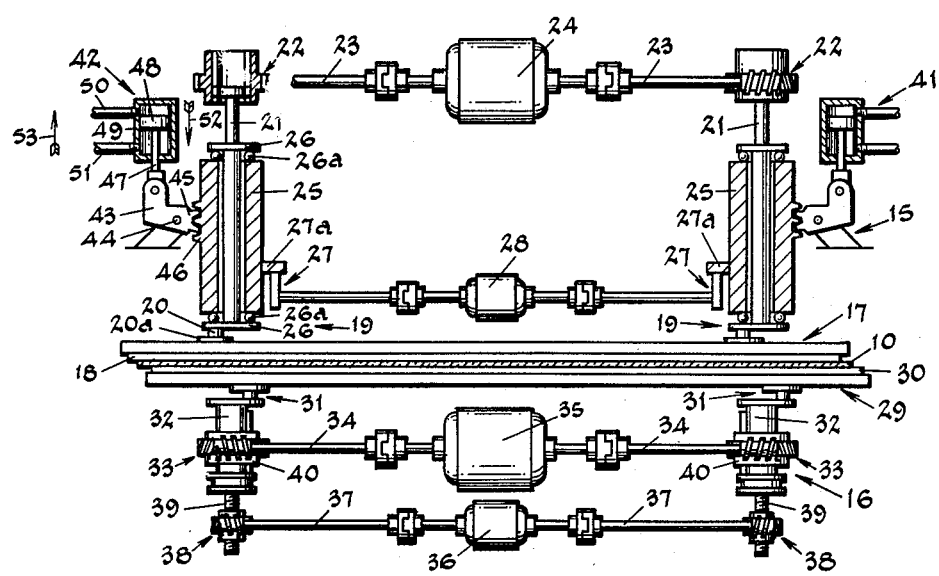
FIG. 1 is a diagrammatic front elevational view partly in section taken along a line transversely of the path of the glass illustrating a polishing apparatus of the rectangular type.
Figure 2:
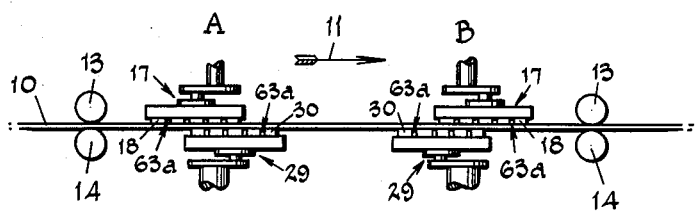
FIG. 2 is a side elevation showing the polishing position of the surfacing runners.

Turning now to FIGS. 1 and 2, there is shown a glass ribbon or sheet 10 being conveyed along in the direction of arrow 11 (FIGS. 2 and 3) by suitable drive rolls 13 and 14. The glass ribbon 10 is carried through a plurality of similar polishing stations A and B (FIG. 2). Only one of these stations, namely station A, is shown in detail (FIG. 1) and inasmuch as stations A and B (FIG. 2) are for all intents and purposes structurally equivalent, there being only a difference in the phasing of the motion of the surfacing tools employed in these stations, it is believed that a description of station A (FIG. 1) will suffice as a description for both stations A and B. It should also be remembered that stations A and B constitute one surfacing unit (FIG. 2) and that any desired number of these units may be located along the path of ribbon 10.

Station A includes an upper surface polishing apparatus or tool 15 and a lower surface polishing apparatus or tool 16 (FIG. 1).

Figure 4:
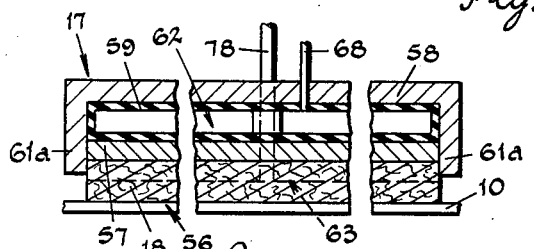
FIG. 4 is a broken vertical sectional view taken along lines 4—4 of FIG. 3;"
Figure 5:
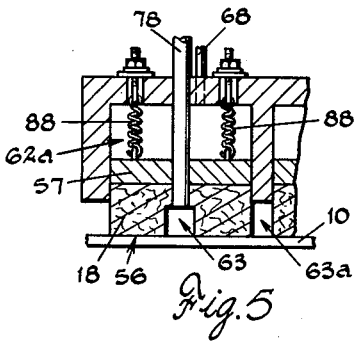
FIG. 5 is a fragmentary cross-sectional view, similar to FIG. 3, of a modification of the present invention.

The upper surfacing apparatus 15 includes a rectangular polishing platen or runner indicated generally at 17 (see also FIGS. 4 and 5). This platen 17 has a felt working face 18 and the platen is driven in its curvilinear translation by eccentric drive mechanisms 19, one secured adjacent each end of platen 17. Each mechanism 19 includes a bell crank or eccentric 20 mounted to platen 17 in bearings 20a and also suitably attached to a shaft 21. Each shaft 21 is connected by a worm gearing system 22 to further shafts 23 which are themselves connected to the drive shafts of motor 24 and rotated thereby in the desired manner. Thus, the upper platen 17 will follow a closed path, namely, a curvilinear translation, as the driving force is imparted thereto by the motor 24 through the linkage 20, 21, 22 and 23 aforedescribed. Shaft 21 is maintained vertically aligned by a casing 25 and while shaft 21 is freely rotatable within casing 25 in bearings 26a, it also is fixedly positioned with respect to the casing 25 by collars 26 and casing 25 is therefore vertically movable with shaft 21. This casing 25 is connected by lug 27a to suitable mechanical lifting gearing 27, and to motor 28 so that casing 25 may be mechanically raised and lowered away from the glass ribbon 10, thus raising and lowering platen 17.

In lowering surfacing apparatus 16, similar components are likewise used to drive the lower platen or runner indicated generally at 29 which has a felt face 30. A bell crank arrangement 31, similar to the arrangement 19 above, at each end of platen 29 is connected to each shaft 32. Each shaft 32 by gearing 33 and shafts 34 is connected to a motor 35 whereby a curvilinear translation movement is imparted to platen 29. Likewise, motor 36 through shafts 37, gearing 38 and further shafts 39 are connected to the casing 40, through which the shaft 32 passes and within which it is held for free rotation so that the lower platen 29 may also be lowered away and out of engagement from the glass ribbon 10 or moved upwardly in order to engage the ribbon 10. Since the detailed structure of the drive mechanism forms only an ancillary portion of this invention, only that structure deemed essential for an understanding of the basic features of the operation of the platens or runners 17 and 29 has been shown and described.

Connected to the casing 25 of the upper surfacing apparatus 15 is a fluid pressure system, the specific one illustrated being a hydraulic pressure system including pressure devices 41 and 42. By means of these devices 41 and 42, the polishing pressure is applied to thrust the surfacing tool 17 positively against ribbon 10. It is believed that the description of one of these devices will serve the purpose of describing both inasmuch as both devices 41 and 42 are identical. An L-shaped arm 43 is pivoted at a shaft 44. This arm 43 has a toothed projection 45 on one end engaging complementary teeth 46 on the casing 25. The plunger 47 of the device 42 is connected to the other end of arm 43 and carries a piston head 48 that is held within a cylindrical hydraulic cylinder 49.

This cylinder is what might be commonly referred to as having a double acting piston. The cylinder 49 in the embodiment shown is connected by means of suitable leads 50 and 51 to a source of vacuum and/or pressure in order to raise or lower plunger 47 as desired. Therefore, as the plunger on piston 47 is optionally driven, for example, downwardly in the direction of arrow 52 by inserting pressure into cylinder 49 from lead 50 and simultaneously bleeding pressure out through lead 51, casing 25 and platen 17 will be lifted up from the glass, to decrease the polishing pressure, by arm 43 pivoting about shaft 44. In the alternative, if piston 47 is raised in the direction of arrow 53 by inserting pressure through lead 51 and simultaneously bleeding pressure out through lead 50, then casing 25 will be forced downwardly by pivoting arm 43 to press the platen 17 against the ribbon 10 and therefore increase the polishing pressure.

Since the lower platen 29 in both the above circumstances would previously have been brought into fixed contact with the glass ribbon by motor 36, the application of thrust or polishing pressure on the top platen 17 will pinch or press the glass 10 between the felt face 18 of the upper platen 17 and the felt face 30 of the lower platen 29. At this time the platens 17, 29 would be in surfacing position and by proper regulation of the pressure in the hydraulic system 41 and 42, it would be possible to place and maintain the proper surfacing pressure upon the glass ribbon and thereby to properly surface the glass ribbon 10 which passes between the surfacing felts 18 and 30. The hydraulic system 41 and 42 therefore applies the positive load pressure which is used to surface the glass and the load pressure is applied after the tools or platens have been placed in engagement with the glass by operation of motors 28 and 36.

As aforediscussed, it is extremely important to maintain proper distribution of the surfacing medium beneath the working face of the surfacing platen. In order to accomplish this and also to insure maximum surfacing work, there has been provided the improved platen or runner shown in FIG. 3. Since the upper and lower platens are identical in most details, it is believed that a detailed description of the upper platen will serve as a description of both.

This platen 17 is composed of a plurality of independent sections 56, the actual number and dimensions of which depend to a great extent upon the particular surfacing requirements. Since each section 56 is identical, it is believed that a detailed discussion of one section 56 will suffice as a description of each and every section.

The felt surfacing portion 18 of each platen section 56 is adhered by an adhesive or other suitable means to the undersurface of a pressure plate 57. Preferably, disposed between the pressure plate 57 and the backing plate 58 of the runner is a resilient, hollow and air-tight diaphragm 59 that is both expandable and retractable as will later be discussed in more detail.

Figure 3:
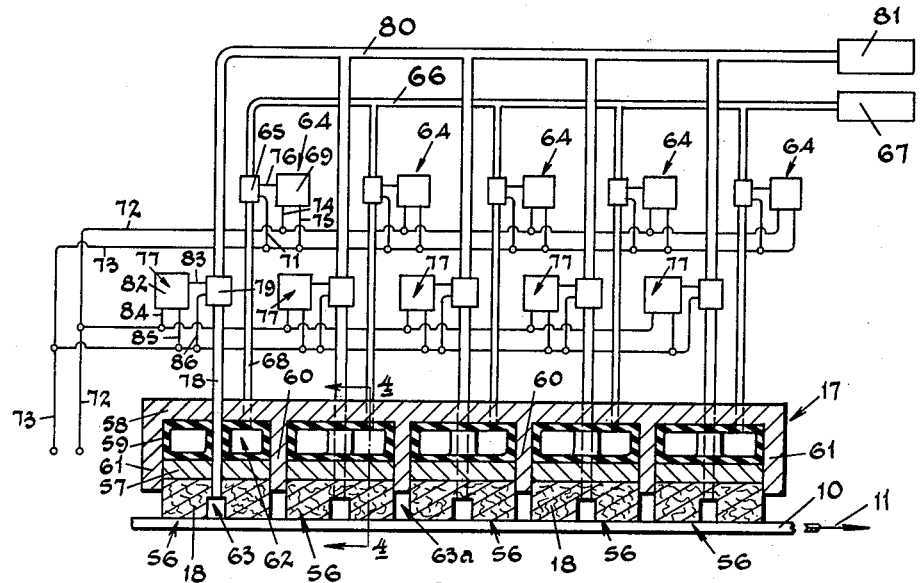
FIG. 3 is a schematic side elevation partly in section showing a detailed view of an upper polishing runner in accordance with the invention.

Each section 56 of the platen 17 is held for vertical slidable movement, i.e. perpendicularly with respect to the plane of the glass ribbon 10, by suitable platen ribs 60 and side walls 61 extending downwardly from the backing plate 58 in spaced, substantially parallel relationship. As seen in FIG. 3, the plate 57 of each section 56 is free to move vertically between adjacent ribs 60 and each side wall 61 and its adjacent rib while constrained by these ribs 60 and side walls 61 against lateral displacement. Also, as seen in FIG. 4, the platen 17 includes a pair of end walls 61a which hold the platen sections 56 against any longitudinal shifting. Thus, the hollow interior or compartment 62 is held substantially air tight by the friction fit between ribs 60, side walls 61 and end walls 61a with plate 57, or such air tightness may be further assured by provision of the diaphragm 59. The plate, however, is as above noted slidable between these ribs, side walls and end walls.

As illustrated in FIG. 3, the felt working face 18 of each runner section 56 has a groove 63 cut therein which runs substantially transverse of the direction of glass movement and longitudinally of the runner 17. As shown in FIG. 4, these grooves or slots 63 are open at both ends of the runner 17, thus forming a continuous open passageway through the runner face 18 transversely across the surface of the glass. It is also pointed out that a further opening 63a is provided beneath the ribs 60 separating adjacent sections 56. The purpose of these openings 63a will become apparent as the description proceeds.

Turning again to FIG. 3, there is provided control means, indicated generally at 64, by which each of the separate sections 56 are selectively and individually raised so as to be disengaged from the surface of glass ribbon 10 at a predetermined or preselected moment. These control means 64 include a double acting pump 65 connected by a conduit system 66 to a suitable source of air 67. The pump 65 is also connected by means of a flexible conduit 68 to the hollow interior 62 of the diaphragm 59 of its respective section 56 of the platen 17. A timer 69 is also provided for each pump 65 to cause it to either introduce air under pressure to the interior 62 of the diaphragm 59 or to cause the evacuation of air from the diaphragm 59. This pump 65 as shown is activated electrically. The pump 65 is connected by a suitable lead 71 to one of the main power lines 72, 73. Each individual timer 69 is connected by leads 74, 75 to the same line source 72, 73 of power and connected by lead 76 to its respective pump 65 so that all of the timers of all pressure control means 64 may be electrically synchronized.

Also, as shown in FIG. 3, the groove 63 in the working face 18 of each section 56 is connected to the polishing medium feed means indicated generally at 77. These means 77 include a flexible conduit 78 connecting groove 63 to a pump 79. This pump 79 is, by a conduit system 80, connected to a source 81 of the polishing medium. The operation of the pump 79 is controlled by a suitable timer 82. The timer 82 and pump 79 for the slurry distribution means 77 for each section 56 are connected to each other by a lead 83, and by leads 84, 85 and 86 to the main power lines 72 and 73. Thus, timers 82 and 69 for all of the polishing medium feed means 77 and all of the pressure control means 64, respectively, may be electrically synchronized one to each other.

In operation, and in order to maintain a constant supply of polishing medium under the working face 18 of each platen section 56, a fluid polishing medium is periodically fed interiorly of each individual section 56 and the fed section is substantially simultaneously raised a small predetermined distance off the ribbon, e.g. 0.1 inch to 0.5 inch. In this respect, the polishing medium is introduced from conduit 78 under pressure into the interior of the section and through the groove 63 into contact with that portion of the glass ribbon 10 immediately thereunder. The raising of a section 56 is accomplished by activating pump 65 of the pressure control means 64 by timer 69 so as to create a vacuum within the interior 62 of the diaphragm 59 of the platen section being fed. In this manner, with the activation of pump 79 of the polishing medium distribution means 77 associated with the particular section 56 and the resulting force created by the polishing liquid flowing downwardly through conduit 78 into groove 63 under pressure, the section will be forced upwardly since there is no pressure being exerted against the pressure plate 57 thereof due to the vacuum created in the diaphragm. Therefore, the pressure exerted by the fluid polishing medium together with the evacuation of the hollow diaphragm will force the plate 57 to rise upwardly and lift the felt working face 18 off the glass, as above noted. The polishing medium will then flow outwardly from the groove 63 across the surface of glass ribbon 10 and under the felt working face 18 of that section.

After feeding is completed, the timer 69 of the pressure control means 64 automatically activates pump 65 and forces air into the diaphragm 59 and causes the felt working face 18 to be thrust downwardly against the surface of the glass. Simultaneously, the timer 82 of the fluid medium distribution means 77 de-activates its pump 79 to discontinue the introduction of the fluid medium through the conduit 78 into groove 63. Any polishing medium remaining trapped in the grooves 63 upon re-engagement of the working face 18 with the glass surface will tend to further saturate and impregnate the felt by absorption thereby.

It might be well here to point out that the pressure exerted by pump 65 upon plate 57 through diaphragm 59 is carefully controlled as against the hydraulic pressure or load pressure induced by the aforedescribed hydraulic system 41 and 42. This hydraulic system 41 and 42 determines the total bearing pressure for the runner as a unit and the individual pressure of each diaphragm 59 is maintained in balance with respect thereto during the polishing operation, i.e. a pressure is created therein through the pressure control means 64 except during the polishing fluid feeding step.

It is, however, also possible to modify the overall bearing pressure induced by system 41 and 42 and exerted by the platen 17 throughout its total area of contact with the glass ribbon. Thus, if desired, it would be possible through control of the individual diaphragm pressures, to exert a greater load pressure on the glass at, for example, the section 56 at the center of the platen than along the edges thereof, or to establish any desired pressure pattern across the transverse extent of the glass ribbon 10 during the polishing operation. In other words, if the total load pressure established by the hydraulic load system 41 and 42 was to be 3 p.s.i., the pressure at each individual section 56 through the use of the selective diaphragm pumps could be the same as, greater than, or less than 3 p.s.i.

This is important since, under certain conditions, it has been found desirable to vary the pressures of each section 56 as compared to the generally established pressure of the hydraulic load system 41 and 42, particularly since the felts themselves wear slightly during surfacing and may, under some circumstances, wear unevenly.

Thus, by the individual pressure control means 64 for each section 56 aforediscussed, greater flexibility is achieved by providing a means whereby it is possible to overcome runner wear for individual sections of the runner and to simultaneously either balance or unbalance, as desired, the load pressure of each section 56 on the surface of glass ribbon 10.

By suitable synchronizing of timers 69 and 82 and pumps 65 and 79 of each section 56 with respect to all other sections, it is possible to feed and raise the sections one at a time, or two at a time, as desired, and also to raise them in sequential order or to vary the pattern, depending upon the surfacing conditions desired.

Another modification of this concept is shown in FIG. 5, wherein the resilient diaphragms have been replaced by tension springs 88. These springs 88 normally tend to lift the plate 57 upwardly. However, this tendency is counterbalanced by the constant application of fluid, e.g. air, from a pump through conduit 68 leading into the chamber 62a whereby a pressure is maintained against the pressure plate 57 to hold the felt 18 against the glass. It is believed clear that in this modification, when this fluid application through conduit 68 is discontinued, the springs 88 will automatically raise the felt 18 off the glass. Thus, in this modification, a mechanical apparatus for raising each section 56 is provided rather than depending upon the pressure of the polishing medium through conduit 78 to raise the felt. The polishing medium pump associated with conduit 78 then is activated only for the purpose of feeding the medium and can do so at a much reduced pressure.

Figure 6:
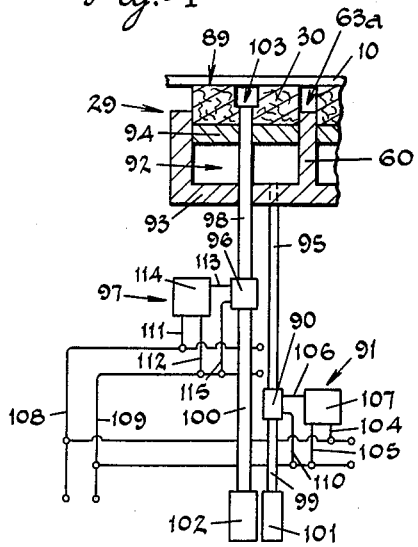
FIG. 6 is a fragmentary, schematic elevational view partly in section showing a lower polishing runner in accordance with the invention.

Turning now to FIG. 6, this same apparatus as described above (FIGS. 3 and 4) is shown operating upon the lower platen or runner 29 separated by ribs 60 in the same manner as above described for upper platen 17. The significant difference between the upper and lower pressure control means is that, because of the weight of each section 89 of the lower platen 29, sufficient air need be introduced from pump 90 of the lower platen control means indicated generally at 91 into the space 92 defined between the platen body or backing plate 93 and the pressure plate 94 of each section 89 only to hold the felt working face 30 attached to this plate 94 against the undersurface of the ribbon. When it is desired to disengage the felt face 30 from the glass and to feed the polishing medium, this air under pressure fed through flexible conduit 95 need only be interrupted and the weight of the plate 94 will cause the section 89 to fall downwardly and away from the glass ribbon 10. At this time, polishing medium would be simultaneously and momentarily introduced under pressure from pump 96 of the lower platen feed means, indicated generally at 97, through a flexible conduit 98 and sprayed against the bottom surface of the glass ribbon 10 to flow across the surface and under those portions of the glass opposite to the felt working face 30. It will be appreciated that any of the polishing medium not adhering to the glass surface will fall back into the face 30 and serve to further impregnate the felt. Pumps 90 and 96 are connected by suitable conduits 99 and 100 to air source 101 and polishing medium source 102, respectively. The lower felts 30 are also grooved as at 103 in a manner similar to the grooves 63 of the upper platen 17. A plurality of electrical leads 104, 105 and 106 connect the timer 107 of the lower platen pressure means to the pump 90 and to the line source of power 108, 109. The pump 90 is also connected to the power line by lead 110. Similar leads 111, 112 and 113 connect the timer 114 to the power lines 108, 109 and to pump 96 of the lower platen polishing medium feed means. Pump 96 is connected to the power line by lead 115. Thus, timers 107 and 114 may be electrically synchronized with respect to each other and also to the other pumps and timers of adjacent polishing fluid pressure means 97 and pressure control means 91.

It will be appreciated that while the working face or rubbing layer of the platens 17 and 29 have been described as being composed of felt, other resilient materials of a different fibrous composition, rubber or a soft plastic, could also be satisfactorily employed. It is a basic requirement only that the materials used have the necessary combination of rigidity and flexibility so that they can follow minute irregularities in the glass surface being polished.

It should further be noted that, although the invention has been described and illustrated in connection with a twin grinding process, the novel runners and method of distributing a polishing medium as disclosed herein may also be employed to advantage in a single surface polishing line wherein the glass sheet or ribbon is supported and carried by a bed plate or carriage, i.e. where only an upper platen, for example, is utilized, such sheet then being turned over and passed again through the same or different line to effect polishing of its undersurface.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In an apparatus for polishing a surface of a traveling continuous glass ribbon, a surfacing tool, the working face of which includes a generally rectangular surfacing runner extending generally transverse to the direction of travel of said ribbon and defined by a plurality of individually movable sections extending longitudinally of the runner, means to apply translatory motion to said runner, means for applying a force to said runner to press said runner as a unit into polishing engagement with said glass ribbon surface, and ancillary pressure control means effective to control the pressure exerted by each of said sections individually on the glass ribbon surface.

2. In an apparatus for polishing a surface of a traveling continuous glass ribbon, a surfacing tool, the working face of which includes a generally rectangular surfacing runner extending generally transverse to the direction of travel of said ribbon and defined by a plurality of individually movable sections extending longitudinally of the runner, means to apply translatory motion to said runner, means for applying a force to said runner to press said sections as a unit into polishing engagement with said glass ribbon surface, and means for individually and selectively disengaging said runner sections from the glass surface thereopposite.

3. In an apparatus for polishing a surface of a traveling continuous glass ribbon, a surfacing tool, the working face of which includes a generally rectangular surfacing runner extending generally transverse to the direction of travel of said ribbon and defined by a plurality of individually movable sections extending longitudinally of the runner, means to apply translatory motion to said runner, means for applying a force to said runner to press said sections as a unit into polishing engagement with said glass ribbon surface, and means for individually and selectively feeding a fluid polishing medium interiorly of said runner sections.

4. In an apparatus for polishing a surface of a traveling continuous glass ribbon, a surfacing tool, the working face of which includes a generally rectangular surfacing runner extending generally transverse to the direction of travel of said ribbon and defined by a plurality of individually movable sections extending longitudinally of the runner, means to apply translatory motion to said runner, means for applying a force to said runner to press said sections as a unit into polishing engagement with said glass ribbon surface, means for individually and selectively feeding a fluid polishing medium interiorly of said runner sections, and means effective substantially simultaneously with said feeding to disengage said sections being fed from the glass surface.

5. In an apparatus for polishing a surface of a glass ribbon, a generally rectangular surfacing runner adapted to engage the said glass ribbon surface, said runner including a plurality of individually movable sections extending longitudinally thereof, a groove in each of said sections extending along the length thereof, and means for individually and selectively feeding a fluid polishing medium to each groove.

6. In an apparatus for polishing a surface of a glass ribbon, a generally rectangular surfacing runner including a backing plate, a pair of opposed side walls and end walls extending downwardly from the backing plate about the periphery thereof, a plurality of spaced ribs extending downwardly from said backing plate in substantially parallel relation to said side walls and dividing said runner into a plurality of longitudinally extending sections, a plurality of pressure plates disposed parallel to and in spaced relation to said backing plate, one of said pressure plates being mounted for vertical movement between each pair of adjacent ribs and each side wall and its adjacent rib, and forming a substantially fluid-tight compartment together with said each pair of adjacent ribs and each side wall and its adjacent rib and said backing plate and end walls, a resilient polishing pad fixed to the underside of each of said pressure plates, means for individually and selectively introducing and evacuating fluid into and from each of said compartments, a longitudinally extending groove in the undersurface of each of said polishing pads, and means for individually and selectively feeding a fluid polishing medium to each groove.

7. An apparatus in accordance with claim 6, in which a hollow air-tight diaphragm is disposed in each of said compartments and receives said fluid introduced into said compartment.

8. An apparatus in accordance with claim 6, in which at least one tension spring is disposed in each of said compartments, one end of said spring being fixed to said pressure plate and the other end of said spring being fixed to said backing plate.

9. In an apparatus for simultaneously polishing both surfaces of a traveling continuous glass ribbon, at least a pair of opposed surfacing tools between which said ribbon travels, the working face of which tools includes a generally rectangular surfacing runner extending generally transverse to the direction of travel of said ribbon and defined by a plurality of individually movable sections extending longitudinally of the runner, means to apply translatory motion to said runners, means for applying a force to at least one of said runners whereby both of said runners are pressed as units into polishing engagement with opposed surfaces of the glass ribbon, means for individually and selectively feeding a fluid polishing medium interiorly of said runner sections, and means effective substantially simultaneously with said feeding to disengage said sections being fed from the glass surface.

References Cited in the file of this patent
UNITED STATES PATENTS

| | | |
|---|---|---|
| 2,859,565 | Javaux | Nov. 11, 1958 |
| 2,882,650 | Price et al. | Apr. 21, 1959 |
| 2,910,813 | De Vore | Nov. 3, 1959 |
| 2,935,823 | Heymes | May 10, 1960 |
| 2,937,480 | Peyches | May 24, 1960 |
| 2,945,330 | Peyches | July 19, 1960 |
| 2,984,051 | Monnet et al. | May 16, 1961 |
| 3,036,410 | Hoyet et al. | May 29, 1962 |